United States Patent [19]
Kersting et al.

[11] 3,799,636
[45] Mar. 26, 1974

[54] BEARING ASSEMBLY FOR A ROLLER

[75] Inventors: Emil Friedrich Kersting, Dusseldorf-Rath; Frank Deimann, Dusseldorf-Holthausen, both of Germany

[73] Assignee: Maschinenfabrik Sack GmbH, Dusseldorf-Rath, Germany

[22] Filed: June 20, 1972

[21] Appl. No.: 264,435

Related U.S. Application Data
[63] Continuation of Ser. No. 114,574, Feb. 11, 1971, abandoned.

[52] U.S. Cl. ............................................. 308/207 R
[51] Int. Cl. ............................................. F16c 43/04
[58] Field of Search .................. 308/207 R, DIG. 9

[56] References Cited
UNITED STATES PATENTS

| | | | |
|---|---|---|---|
| 3,080,199 | 3/1963 | Rickley | 308/207 R |
| 2,565,759 | 8/1951 | Danley et al. | 308/207 R |
| 3,108,839 | 10/1963 | Johnson | 308/207 R |

*Primary Examiner*—Charles J. Myhre
*Assistant Examiner*—Barry Grossman
*Attorney, Agent, or Firm*—Toren and McGeady

[57] ABSTRACT

A bearing assembly for a roller of, for example, a steel rolling mill, comprises an inner bush with a conical bore to receive tightly a conical pin projecting from the roller, an outer bearing bush rotatably surrounding the inner bush but axially captive, and a holder to which the outer bush is fixed. The bearing assembly further includes a hydraulic jacking arrangement for forcing the bearing assembly over the conical pin of the roller and withdrawing it again.

In one example the fluid pressure operable means is a double acting cylinder arrangement comprising an inner cylinder surrounding an extension of the roll pin and arranged to abut against a stop at the end of the extension, a collar surrounding the inner cylinder and sliding within an outer cylinder which has an external flange at its axially outer end arranged to engage a flange of a part rigid with the bearing holder. The spaces on either side of the collar between the two cylinders form pressure chambers and are closed at the axially outer ends by an L-shaped bush and at the axially inner end by a reduced diameter portion of the outer cylinder. Fluid pressure connections lead to the two pressure chambers.

Two other examples are described in which separate cylinders are used for mounting and withdrawing the bearing rather than a double acting cylinder as in the first example. The various parts have discontinuous flanges in the form of a series of radially projecting lugs which can be engaged together by giving one part a part-turn relative to the other in the manner of a bayonet catch.

21 Claims, 6 Drawing Figures

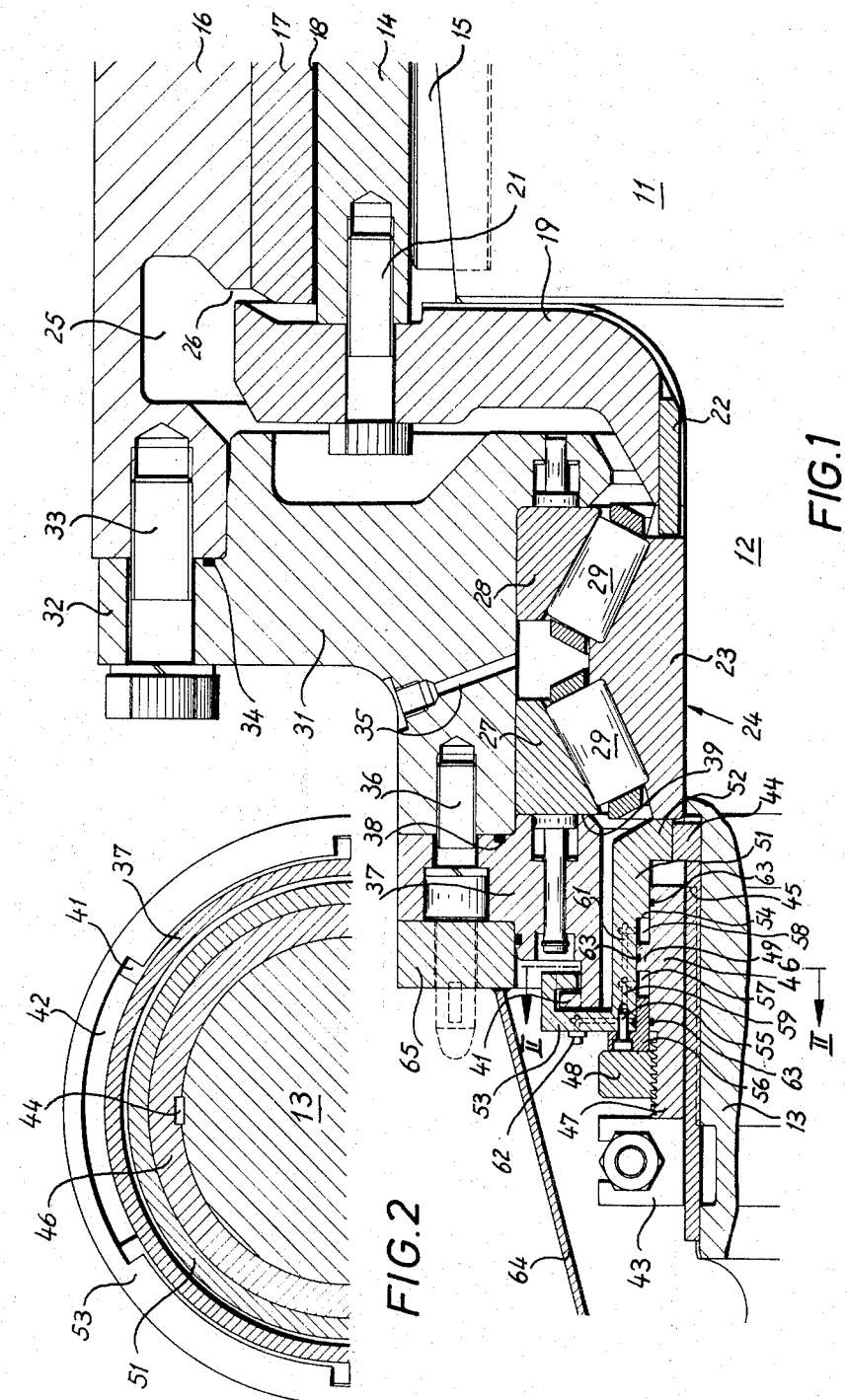

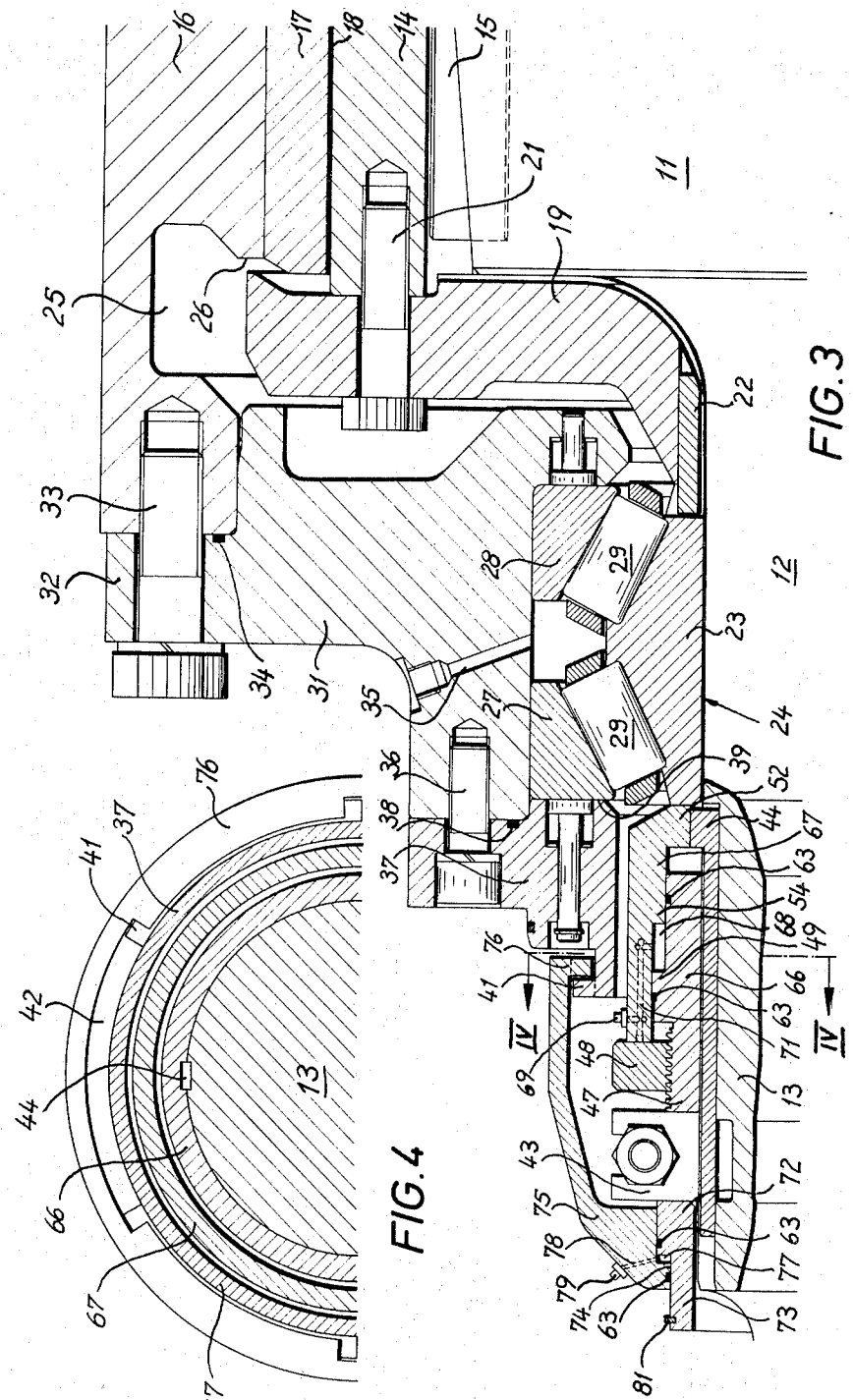

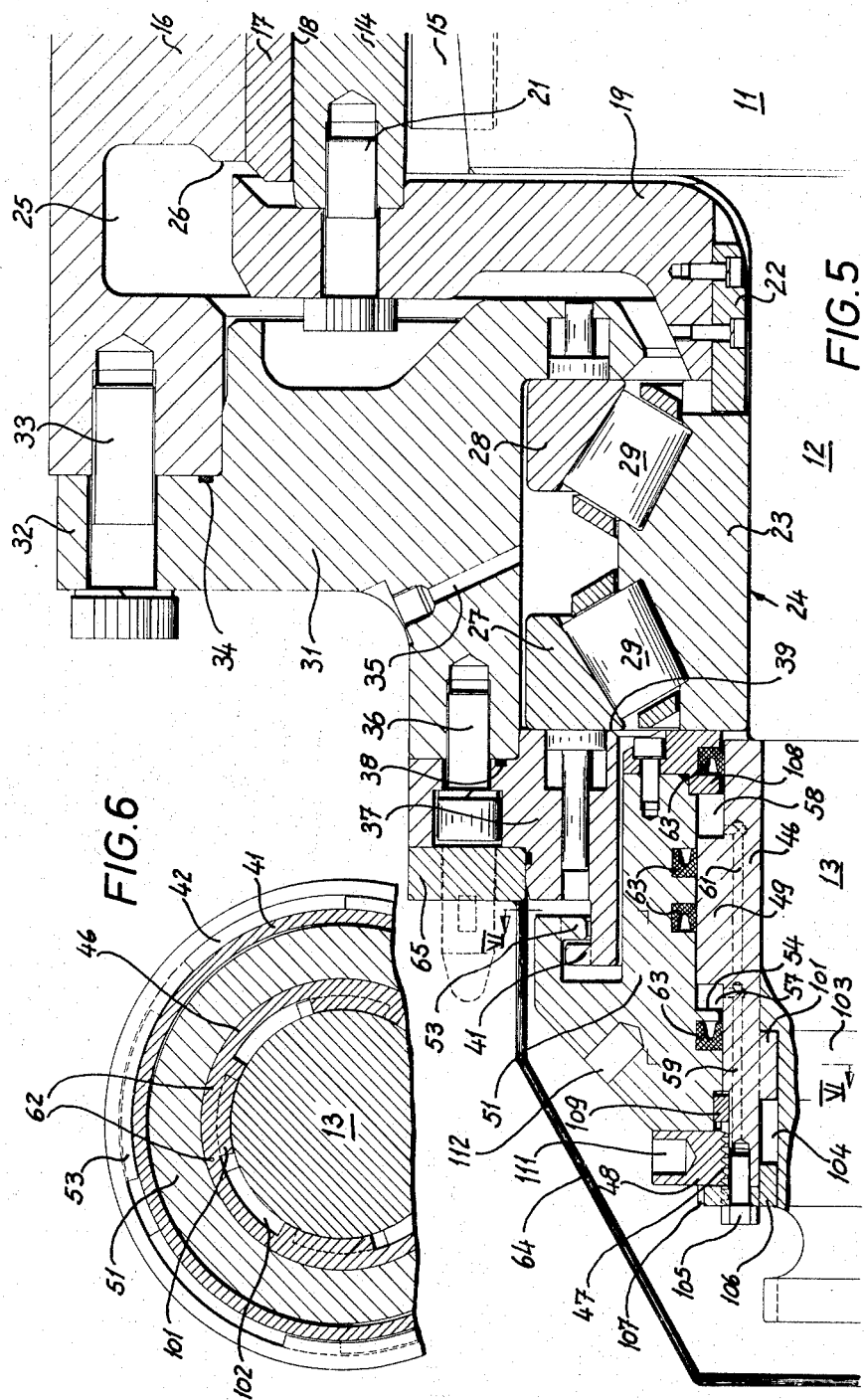

BEARING ASSEMBLY FOR A ROLLER

This is a continuation of application Ser. No. 114,574 filed Feb. 11, 1971, now abandoned.

The invention relates to bearings for rollers such as are used, for example, in steel mills. Such bearings comprise a journal bush which can be pushed over a roll pin projecting axially from the roller end and which rotates in a bearing bush fixed to a stationary holder, the two bushes and the holder forming an assembly which can be pulled off as a unit from the roll pin.

Bearings of this kind, which are usually plain bearings, are used chiefly in heavy machines such as steel rolling mill stands, where the bearings must be of very high quality.

The two roll pins, at the two ends of the roll are usually conical, in which case the journal bush of the bearing is also conical internally, to fit the conical roll pin end. The bush is usually keyed to the pin to ensure that the bush rotates with the pin. The journal bush is ordinarily externally cylindrical and it rotates in the stationary bearing bush which is internally cylindrical. The holder may be mounted in, for example, a stationary roll stand. To minimise friction, a film of lubricating oil is forced in under pressure between the two sliding surfaces, that is to say between the outer surface of the journal bush and the inner surface of the bearing bush.

In the operation of rolling mills the surface of the roll is highly loaded and is soon so worn that it becomes necessary to remove the roll, together with its bearings, from the roll stand and replace it with a new or reconditioned roll. The bearings last much better than the roll, that is to say when the roll itself needs to be replaced, the bearings are usually still perfectly good. It is therefore the practice, when a roll has been removed from the roll stand, to remove the bearings from the two roll pins and mount them on the pins of the replacement roll.

The removal of the bearing from the pin, and its subsequent mounting on the pin of the next roll has hitherto not been an easy or rapid operation. What is required is to arrange the bearing in such a way that it can be rapidly and easily pulled off the roll pin, without damaging the bearing, and subsequently mounted, rapidly and easily, on the pin of the replacement roll. Pulling the bearing off the roll pin, where it must seat with great precision, involves the application of a considerable tractive force, and the bearing must be thrust into place on the pin of the replacement roll with sufficient force and precision. It is important that the entire bearing assembly should remain in one piece during the operations of drawing it off the roll pin and mounting it on the replacement pin, to ensure that the bearing assembly is not damaged and to prevent the introduction of dirt. In particular the sliding, oil coated bearing surfaces themselves should not be separated during these operations.

Various attempts have been made to solve these problems. For example, the journal bush and the pin bearing bush may have annular shoulders which engage with each other, or annular devices may be used which are mounted when they are required. The purpose of these arrangements is to allow the three main parts of the bearing, the journal bush, the bearing bush and the bearing bush holder to be pulled off together, as a unit, from the conical pin of the roll. This applies both to the axially constrained pin at the one end of the roll and to the axially floating pin at the other end of the roll. The roll pin may have a reduced diameter extension carrying an externally threaded ring onto which a retainer nut can be screwed. This allows the roll pin to be held back while the bearing is being pushed over the pin. On the other hand when it comes to pulling the bearing off the pin the arrangement is not so satisfactory because of the very high tractive force required. Special traction devices have to be mounted on the bearing, and subsequently they have to be removed again. The operations are time consuming and costly in labour.

In order to avoid the use of special traction devices for pulling the bearing off the pin, it has been proposed to equip the retainer nut with an external annular shoulder which engages behind and has a greater diameter than an inward projecting annular shoulder mounted on a housing ring attached to the bearing bush holder. To pull the bearing off the pin the operator unscrews the retainer nut on the externally threaded ring which is prevented from rotating relative to the roll pin, or alternatively he can rotate the externally threaded ring on the roll pin, in either case advancing the retainer nut axially outwards away from the roll. The retainer nut in turn thrusts the shoulder of the housing ring axially outwards, drawing the bearing bush holder, the bearing bush and the journal bush off the roll pin, the journal bush and the bearing bush being locked together by the engaging annular shoulders, or attached annular devices already mentioned above.

Even with this arrangement, considerable difficulties remain. In particular the retainer nut is under a high axial load which makes it hard to unscrew. The torque needed is higher than can be applied to the nut using a conventional spanner. A special device has to be attached to the retainer nut and a crane has to be used, the crane cable attached to the special device. By operating the crane sufficient torque is applied through the attached device to the retainer nut to unscrew the latter. All this takes up a considerable amount of time and labour. A further disadvantage of this method is the risk of injury to the operating personnel should the crane cable slip, that is to say should purchase on the retainer nut be lost. Finally this method for removing and replacing roll pin bearings does not allow the bearing to be thrust over the conical roll pin with precisely the desired amount of thrust, because the exact amount of torsional friction between the threads of the retainer nut and those of the externally threaded ring cannot usually be determined.

In accordance with the present invention, a bearing assembly for a roller comprises a journal bush which may in use be fitted over an axially projecting pin of the roller, a bearing bush within which the journal bush is free to rotate but axially captive, a stationary holder to which the bearing bush is fixed, and a fluid pressure operable device arranged in use to engage a stop fixed to the pin of the roller and acting both to thrust the journal and bearing bushes and the holder towards the roller to force the journal bush home on to the pin when fitting the bearing to the roller and to draw the bearing away from the pin when removing the bearing from the roller.

This enables the bearing assembly to be removed from the roll pin and replaced extremely rapidly by a single operator, without any necessity to use costly special tools. The thrust applied in mounting the bearing on the roll pin can be accurately controlled, and a retainer nut can be released, during the processes of removing and remounting the bearing, from the axial thrust which it sustains when the roll is in operation. The possibility of damage to the bearing is reduced to a minimum and the use of hydraulic or pneumatic pressure allows the bearing to be thrust onto the conical roll pin in a precisely controlled manner.

The fluid pressure operated means for thrusting the bearing assembly on and off the roller pin may be arranged in a wide variety of ways. Nevertheless the three arrangements which will be described below in some detail have proved particularly advantageous.

In the first place the fluid pressure operable means may be a double acting cylinder assembly. Hydraulic or pneumatic thrust is applied in the one direction when the bearing is being removed from the roll pin, and in the other direction when it is being mounted on a fresh roll pin. A particularly advantageous arrangement consists in that the inner cylinder of the double acting cylinder is in the form of a radially keyed ring mounted on the outer roll pin extension between the mechanical stop and a shoulder of the roll pin extension, the inner cylinder having on its outer end, nearest to the mechanical stop, an external thread on which is screwed a retainer nut, and projecting radially outwards from its inner part, which is not threaded, a peripheral collar ring whose peripheral surface rests in working contact with the inner cylindrical surface of an outer cylinder which surrounds the inner cylinder where the inner cylinder is not threaded.

In this arrangement the inner cylinder acts as an axially fixed support which the outer cylinder uses for applying thrust in the one or other axial direction to the bearing.

An L-section bush may be attached to the outer end of the outer cylinder, nearest to the retainer nut, the inner cylindrical surface of the bush resting in working contact with the outer peripheral surface of the inner cylinder, the axially outer surface of the L-section bush resting in contact with the retainer nut, the axially inner end of the outer cylinder, that is the end away from the retainer nut, having a radially inward step bringing the cylindrical inner surface of the outer ring into working contact with the outer peripheral surface of the inner cylinder. The effect obtained is that the two cylinders, the L-section bush, the peripheral collar ring and the radially inward step between them form two annular pressure chambers in which the hydraulic pressure applies thrust, in the one or the other axial direction, for withdrawing the bearing from the roll pin and replacing it on a fresh roll pin.

During the process of removing the bearing from the roll pin, the outer cylinder applies traction directly or indirectly to the pin bearing bush holder, whereas during the operation of the roll the outer cylinder rotates relative to the holder. For this purpose the axially outer end of the outer cylinder, that is the end nearest to the retainer nut, may have a radially outward terminal flange, hook-shaped in cross-section, the end of the hook extending behind the radially outward flange of a pressure ring which can be detachably attached through an annular bearing housing to the bearing bush holder, the hook end not touching the flange, both the hook end and the flange having peripheral gaps to give a bayonet catch action. The outer cylinder may then have at its axially inner end, away from the retainer nut, a radially inward annular flange whose axially inward face can thrust axially against a shoulder ring detachably connected to the roll pin journal, or alternatively can thrust axially against the inner ring of an axial bearing, the inner ring itself thrusting axially against the shoulder ring. Consequently when the roll is in operation the rotating parts can rotate freely without interference with the stationary parts.

When the bearing is being pulled off the roll pin and hook sectioned flange of the outer cylinder engages with the flange of the pressure ring, applying traction to the latter. Finally, the bayonet catch action of these two flanges allows rapid and easy dismantling of the parts of the bearing. In the case of the axially constrained roll pin, the arrangement allows the thrust applied during the mounting of the bearing on the pin to be transmitted from the double acting cylinder through the inner ring of the axial thrust bearing and through the shoulder ring to the roll pin journal bush.

The annular pressure chamber formed by the L-section bush, the peripheral collar ring, and the radially inward step, preferably communicate through drillings through the wall of the outer cylinder to rapid action hydraulic or pneumatic connections. An advantageous simplification of the hydraulic fluid supply is obtained in that each pressure chamber is connected to its own rapid action hydraulic connection situated on the axially outer face of the hook section flange. In order to apply hydraulic thrust in the one axial direction or the other, the operator need merely connect the hydraulic supply hose to one or other of the hydraulic rapid connections, supplying hydraulic fluid under pressure to the one or the other of the pressure chambers.

For particular purposes it has for example been found advantageous to arrange that the fluid pressure operable device comprises one or more single acting cylinders. In this case each of the two single acting cylinder assemblies, each consisting of an inner cylinder and an outer cylinder, performs only one of the two necessary operations, that is to say one of the two single acting cylinders is used for pulling the bearing off the roll pin, the other single acting cylinder being used for mounting the bearing on the fresh roll pin. The inner cylinder of the cylinder assembly used for mounting the bearing on the fresh roll pin is essentially of the same construction as the inner cylinder of the double acting cylinder assembly mentioned further above, with the difference however that no thrust supporting shoulder need be provided on the roll pin extension, because this inner cylinder applies axial thrust only in the outward direction, through the retainer strap. In this cylinder assembly the outer cylinder is of simpler construction, because there is only one pressure chamber between the inner and outer cylinders. There is therefore no L-section bush mounted on the axially outer end of this outer cylinder. Furthermore this outer cylinder need not have a hook sectioned radially extending flange because it is not used for applying an axially outward traction to the pressure ring. This outer cylinder is used only for applying an axially inward thrust to the roll pin journal bush, the outer cylinder having for this purpose at its axially inner end a radially inward flange which applies an axially inward thrust to the roll pin journal bush either directly through a shoulder ring or, in the case of an axially constrained bearing, through the inner ring of the axial thrust bearing and through the shoulder ring. The single pressure chamber communicates through only one hydraulic duct to the rapid action hydraulic connection.

The corresponding arrangements used for pulling the bearing off the conical roll pin hydraulically or pneumatically are as follows. A second cylinder assembly is provided, also consisting of an inner cylinder and an outer cylinder. The inner cylinder is in the form of a ring mounted over the outer end of the roll pin extension, the axially inward face of this inner cylinder resting in contact with the axially outer face of the retainer strap. The inner cylinder has, at its axially inward end, a radially outwardly projecting peripheral step, whose outer peripheral surface rests in working contact with the inner cylindrical surface of the outer cylinder. The outer cylinder has, at its axially outer end, a radially inwards projecting step, whose inner cylindrical surface rests in working contact with the outer peripheral surface of the inner cylinder. The outer cylinder extends axially inwards to form a bell shaped cap, whose axially inward end has a flange projecting radially inwards. This flange has peripheral gaps to give a bayonet catch action. The inward projecting flange engages behind a radially outward projecting flange of a pressure ring attached, through an annular bearing housing, to the pin bearing bush holder. The radially outward flange of the pressure ring also has peripheral gaps so that a bayonet catch action is obtained in conjunction with the inward flange of the outer cylinder. These two flanges do not touch each other, when the roll is in operation. It should be observed that the outer cylinder rotates, whereas the pressure ring is stationary. The inner and outer cylinders between them enclose an annular pressure chamber which communicates, through a drilling penetrating through the wall of the outer cylinder, with a hydraulic or pneumatic connection.

This version of the fluid pressure operable means involves principally a subdividing of the double acting cylinder of the first version into two separate cylinder assemblies, one of which is used when the bearing is being drawn off the roll pin, whereas the other cylinder assembly comes into action when the bearing is being mounted on a fresh roll pin. The main advantage obtained, compared to the double acting cylinder arrangement, is that the two separate cylinder assemblies provide a simpler construction which is less costly to manufacture and easier to assemble. On the other hand, however, the double acting cylinder arrangement has the practical advantage that all the parts which are used for removing and replacing the bearing remain on the bearing during operation of the roll.

In both the versions of the invention described above an advantageous arrangement consists in that the mechanical stop is in the form of a retainer strap consisting of several parts. However it has been found that a still better arrangement is obtained by arranging the bearing in such a way that the mechanical stop is in the form of a radially projecting rib projecting outwards from the surface of the roll pin extension.

In this third version the retainer strap is eliminated. This is a considerable advantage, because the retainer strap is a robust and comparatively heavy device. Its elimination considerably speeds up the manipulations. This third version of the invention is characterised in particular in that radial ribs project outwards evenly distributed around the periphery of the outermost roll pin extension, a collar projecting inwards from the inner cylindrical surface of the inner cylinder, the inward collar having gaps distributed around the periphery to agree with the positions of the ribs, the widths of the gaps being equap to the widths of the radial ribs.

The bearing is particularly easy to mount on the roll pin. After sliding the bearing over the roll pin extension, the operator rotates the inner cylinder to engage the bayonet catch formed by the projections of the inward collar of the inner cylinder, on the one hand, and the ribs projecting radially outwards from the roll pin extension. The bearing can then be tightened onto the conical roll pin, the inner cylinder thrusting with the projecting parts of its inward collar against the radial ribs of the roll pin extension, thrusting the roll pin axially outwards. Subsequently, after the bearing has been released from the conical surface of the roll pin, it can easily be removed entirely, after rotating the inner cylinder so as to release the bayonet catch. There is no necessity for the operator to remove a heavy retainer strap.

This arrangement, consisting essentially of an inner bayonet catch, involving the inner cylinder, and an outer bayonet catch, involving the hook sectioned outer flange of the outer cylinder, can be arranged particularly conveniently, if the number of radial ribs projecting from the roll pin extension is different from the number of gaps in the hook sectioned flange of the outer cylinder. When the operator desires to remove the entire bearing assembly from the roll pin, after he has rotated the inner cylinder so as to disengage the inner bayonet catch, the outer bayonet catch, involving the hook sectioned outer flange of the outer cylinder, still remains in an engaged position, that is to say the inward projections of the hook end are still engaged behind the outward projections of the radial flange of the hydraulic pressure ring, which can be detachably connected through an annular bearing housing to the bearing bush holder. After the bearing has been released from the conical surface of the roll pin, the operator can therefore easily remove the entire bearing assembly from the roll pin and its extensions, merely by pulling it off in one piece. After the bearing assembly has been removed from the roll pin, the outer cylinder can easily be removed from the remainder of the bearing assembly, merely by rotating the outer cylinder enough to disengage the outer bayonet catch, and withdrawing the outer cylinder. In view of the forces involved the outer bayonet catch should have a 15° engagement, when the inner bayonet catch is disengaged. This may be obtained by giving the roll pin extension four outwardly projecting ribs and giving the hook sectioned flange three gaps to the effect that each roll pin extension rib extends through an arc of 45°, whereas each gap of the hook sectioned flange extends through a 60° arc.

In order to facilitate assembly of the double action cylinder, a particularly convenient arrangement consists in that at the axially inner end of the outer cylinder a bush is inserted between the inner and outer cylinders. In the first example of the invention described above it is necessary for manufacturing reasons to have a bush fixed to the axially outer end of the outer cylinder. The application of hydraulic pressure, for retracting the bearing from the roll pin, applies a high axially outward thrust to this bush, sufficient for releasing the bearing from the conical roll pin. In the third version of the invention, on the other hand, the retractive load is taken directly by a shoulder of the outer cylinder.

Three examples of bearing assemblies in accordance with the invention, each incorporating a different one of the three fluid pressure operable devices broadly described above, are illustrated in the accompanying drawings, in which:

FIG. 1 is an axial section through the first example;

FIG. 2 is a cross section taken along the line II — II in FIG. 1;

FIG. 3 is an axial section through the second example;

FIG. 4 is a cross section taken along the line IV — IV in FIG. 3.

FIG. 5 is an axial section through the third example; and,

FIG. 6 is a cross section taken along the line VI — VI in FIG. 5.

The drawings all show the fixed bearing at one end of the roll, but as will be obvious from the following description the bearing assembly according to the invention can equally well be used with the floating bearing at the other end of the roll, in which case of course there is no axial thrust bearing.

In FIGS. 1, 3 and 5 the end of the conical roll pin is shown at 11. The roll pin end 11 has an inner roll pin extension 12, which is itself extended by an outer roll pin extension 13, both these extension being parallel sided cylinders.

In FIGS. 1, 3 and 5 the bearing is fully drawn in axially over the roll pin, that is to say the bearing is in its operational position. A roll pin journal bush 14 has been mounted as an exact fit on the conical roll pin end 11, secured against rotation relative to the pin by a key 15, which fits in corresponding key grooves in the journal bush 14, on the one hand, and in the conical roll pin end 11. The roll pin journal bush 14 rotates in a bearing bush 17 mounted in a bearing bush holder 16. Between the working surface of the journal bush 14 and the working surface of the bearing bush 17 there is an oil film 18, for lubrication.

Axial thrust from the journal bush 14 is taken by a shoulder ring 19 screwed to the outer end face of the journal bush 14, that is to say the lefthand end face in FIG. 1. The shoulder ring 19 transmits the axial thrust, by its outer end face, to the inner ring 23 of an axial thrust bearing 24. The inner bearing ring 23 and the shoulder ring 19 are prevented from rotating relative to each other by a key 22. Thus the roll pin 11, the journal bush 14, the shoulder ring 19 and the inner bearing ring 23 all rotate together.

The bearing bush 17 is fixed firmly in the bearing bush holder 16. An internal groove 25 in the bearing bush holder 16 has an annular shoulder 26 capable of thrusting axially against the edge of the shoulder ring 19, that is to say the internal diameter of the annular shoulder 26 is less than the external diameter of the shoulder ring 19. These two parts, the annular shoulder 26 and the shoulder ring 19, cooperate with each other as follows. When the roll pin bearing is being withdrawn from the roll pin, that is to say when the bearing is being pulled off the roll pin end, the bearing bush holder 16 thrusts with its annular shoulder 26 against the shoulder ring 19 so that the parts 16, 17, 19 and 14 all slide off the roll pin together.

The axial thrust bearing 24 has two sets of bearing rollers 29 and two outer race rings 27, 28, the bearing being contained in an annular housing 31 screwed by an outer flange 32 to the bearing bush holder 16, a sealing ring 34 being interposed to make a good seal. The axial thrust bearing 24 is supplied with lubricant through a duct 35 penetrating through the annular housing 31.

To the outer face of the annular bearing housing 31, that is to say to its lefthand face as seen in FIG. 1, there is attached by a screw 36 a hydraulic pressure ring 37, with the interposition of a sealing ring 38, to make a good seal. The hydraulic pressure ring 37 has an inner face 39 which thrusts against the race ring 27. At its outer end, furthest away from the roll pin conical end 11, the hydraulic pressure ring 37 terminates in an external flange 41 which has gaps 42 around its edge to give it a bayonet catch action.

As shown in FIGS. 1 and 3, the outer end, that is to say the lefthand end, of the outermost extension 13 of the roll pin has a peripheral groove into which engages a retainer strap 43, which is preferably made in two parts. The retainer strap 43 is prevented from rotating relative to the roll pin by an axial key 44. The middle roll pin extension 12 terminates at its outer end in a shoulder 45, as shown in FIG. 1. Mounted on the outer roll pin extension 13, between the shoulder 45 and the retainer strap 43 there is an inner hydraulic cylinder 46, which is also prevented from rotating relative to the roll pin by the axial key 44. The outer end of the hydraulic cylinder 46, that is to say the end nearest to the retainer strap 43, has an external thread 47 on which is screwed a retainer nut 48. The inner part of the hydraulic cylinder 46 has, projecting outwards from its surface, which is not a threaded surface, a peripheral collar ring 49 of rectangular cross section.

Surrounding the smooth surfaced inner part of the hydraulic cylinder 46, that is to say the non-threaded part, there is an outer cylinder 51, whose inner end terminates in an inward annular flange 52, whose inner face rests in firm contact with the inner ring 23 of the axial thrust bearing 24. The outer end of the outer cylinder 51, towards the left in FIG. 1, has an outward flange 53 which is hook shaped in cross section, the end of the hook projecting radially inwards behind the flange 41 of the hydraulic pressure ring 37 but without touching the flange 41. These two parts must not touch each other, because the outer cylinder 51 is a rotating part, whereas the hydraulic pressure ring 37 is stationary. Both the flange 41 and the hooked over part of the flange 53 have peripheral gaps to give a bayonet catch action. Near its inner end, towards the right in FIG. 1, the outer hydraulic cylinder 51 has a radially inward projecting step 54, bringing the inner surface of the outer cylinder 51 into working contact with the outer surface of the inner hydraulic cylinder 46. Attached to the outer end of the cylinder 51, by means of screws 55, there is an L-section bush 56 whose outer face rests in firm contact with the inner face of the retainer nut 48. The internal cylindrical surface of the L-section bush 56 rests in well fitting contact with the outer peripheral surface of the inner cylinder 46, near the external thread 47.

Between the two hydraulic cylinders, the inner cylinder 46 and the outer cylinder 51, there are thus formed two hydraulic pressure chambers 57 and 58. Hydraulic fluid can be fed under pressure to the chambers 57 and 58 through separate drillings 59 and 61 penetrating through the wall of the outer cylinder 51, the hydraulic fluid being supplied through rapid action hydraulic connections 62. The chambers 57 and 58 are hydraulically sealed by sealing rings 63 at the contact surfaces between the inner and outer cylinders.

The entire rapid change assembly is protected by a cover 64 with a welded flange 65 for attachment to the hydraulic pressure ring 37. The cover can be removed to give access to the parts of the assembly.

From the above description of the example of the invention represented in FIG. 1 it emerges that during operation of the roll the following parts rotate: the roll pin 11, the journal bush 14, the shoulder ring 19, the inner bearing ring 23, the outer hydraulic cylinder 51, which is keyed to the roll pin outer extension 13, the inner hydraulic cylinder 46 with the retainer nut 48 and the retainer strap 43, whereas the following parts remain stationary: the bearing bush 17, the bearing bush holder 16, the annular bearing housing 31, the hydraulic pressure ring 37 and the outer cover 64.

The rapid change device according to the invention represented in FIG. 1 functions as follows. Let it be assumed that the roll requires attention and has been removed from the roll stand. It is desired to remove the bearing from the roll pin. After removing the outer cover 64, a source of hydraulic fluid is connected to the rapid hydraulic connection 62, which communicates with the hydraulic chamber 58. Hydraulic fluid is admitted under pressure to the chamber 58, thrusting the inner hydraulic cylinder 46 towards the left, the outer end of the inner cylinder 46 thrusting against the inner face of the retainer strap 43. In the opposite direction the hydraulic fluid in the chamber 58 thrusts the outer cylinder 51 towards the right, the inner end of the cylinder thrusting against the inner bearing ring 23. This double thrust in opposite directions unloads the retainer nut 48, so that it can easily be unscrewed by the operator. After unscrewing the retainer nut 48, the operator releases hydraulic pressure from the chamber 58, and admits hydraulic fluid under pressure through the other rapid hydraulic connection into the pressure chamber 57. The inner cylinder 46 slides towards the right, the retainer nut 48 having been loosened enough to allow this, until the inner end of the cylinder 46 comes up against the shoulder 45, which is the outer end of the inner roll pin extension 12. Acting against this shoulder 45 the inner cylinder 46 thrusts the roll pin towards the right. In the opposite direction, the outer cylinder 51 moves towards the left, bringing the hook end of the hook sectioned flange 53 into engagement with the flange 41 of the hydraulic pressure ring 37, thrusting the hydraulic pressure ring 37 outwards, that is to say towards the left. This outward thrust, towards the left, is transmitted through the annular bearing housing 31 to the pin bearing bush holder 16 and to the pin bearing bush 17, and through the shoulder 26 to the shoulder ring 19, the journal bush 14 and the inner bearing ring 23, so that all these parts are retracted outwards, towards the left, from the roll pin 11. After the hydraulic pressure has been released from the chamber 57, the retainer strap 43 is removed, and the entire assembly is removed from the roll pin 11 and from its extensions 12 and 13.

The rapid change device is mounted on the roll pin of a fresh roll as follows. To begin with, the rapid change assembly is pushed into place over the outer and inner roll pin extensions 13, 12 and over the roll pin end 11. The retainer strap 43 is secured in the annular groove of the outer roll pin extension 13. It is then necessary to slide the assembly up tight into its final position on the roll pin end. This is done as follows. Hydraulic pressure is admitted, through the rapid hydraulic connection, into the pressure chamber 58. The inner cylinder 46 is thrust outwards, to the left, up against the retainer strap 43. In the opposite direction, towards the right, the outer cylinder 51 is thrust by the hydraulic pressure until its inner end 52 thrusts inwards against the inner bearing ring 23, this inward thrust being transmitted through the shoulder ring 19 to the pin journal bush 14, thrusting the pin journal bush 14 inwards over the conical surface of the roll pin end 11. Finally the operator tightens the retainer nut 48, bringing it easily into contact with the outer surface of the L-section bush 56. After the operator has removed the hydraulic pressure from the chamber 58, the mounting of the rapid change device on the roll pin 11 has been completed. After the outer cover 64 has been mounted, the roll can be installed in the roll stand, ready for operation.

The invention allows roll pin bearing changes to be made rapidly, easily and reliably and practically without the use of special tools. A particular advantage obtained, in contrast to all the known bearing change devices, is that practically all the tools required remain in place as a part of the roll pin bearing assembly.

FIGS. 3 and 4 show a second version of the invention. This differs from the version described above essentially in that instead of a double acting hydraulic cylinder, two single acting cylinders are used, one for tightening the bearing assembly up on the roll pin end, and the other for drawing it off. In regard to the arrangements for tightening the bearing up on the roll pin conical end, these are essentially the same in the present version as in the version described above. On the other hand the arrangements for drawing the bearing off the pin end are different. In the present version of the invention there is no shoulder 45. During the drawing off operation the axial thrust applied to the roll pin in the inward direction, towards the right, is transmitted through the retainer strap 43. The present version has an inner cylinder 66 and an outer cylinder 67. The outer cylinder 67 is used only when the bearing is being tightened on to the conical end of the roll pin, and consequently the outer cylinder 67 can be of simpler construction. In particular it has no hook shaped outward flange 53, and no L-section bush 56. The outer end of the outer cylinder 67, that is to say the lefthand end, rests directly in contact with the inner surface of the retainer nut 48. Between the inner cylinder 66 and the outer cylinder 67 there is a single pressure chamber 68, limited on the left by the peripheral collar ring 49, projecting outwards from the wall of the inner cylinder 66, and on the right by the inward step 54, projecting inwards from the internal cylindrical surface of the outer cylinder 67. The external thread 47 of the inner cylinder 66 extends all the way to the peripheral collar ring 49, there being no hydraulic pressure chamber on this side of the collar ring 49. Only two sealing rings 63 are required between the inner and outer cylinders.

In this version of the invention, as represented in FIGS. 3 and 4, the bearing is tightened up on to the roll pin conical end as follows. After the entire bearing assembly has been pushed as a unit into place over the roll pin extensions 13 and 12, and over the conical end of the roll pin 11, the retainer strap 43 is secured in the peripheral groove of the roll pin extension 13. To tighten the bearing assembly up on the conical roll pin end, the operator admits hydraulic fluid under pressure through the rapid hydraulic connection 69 and through the drilling 71 into the annular pressure chamber 68, the hydraulic fluid being preferably a hydraulic oil. The hydraulic pressure thrusts the inner cylinder 66 outwards, towards the left, against the retainer strap 43. In the opposite direction, the outer cylinder 67 is thrust towards the right, its inner end flange 52 thrusting against the inner bearing ring 23, the thrust being transmitted so that the bearing is thrust home tight on the conical end of the roll pin 11. The operator can then easily tighten the retainer nut 48 by hand, bringing it into contact with the outer end of the outer cylinder 67. After the operator has released the hydraulic pressure from the chamber 68, disconnecting the hydraulic source from the rapid hydraulic connection 69, the retainer nut 48 ensures that the bearing remains tight on the conical end of the roll pin.

The procedure for drawing the bearing off the conical roll pin end is as follows. The operator first of all mounts on the outer end of the outermost roll pin extension 13 an annular inner cylinder 73, as represented in FIG. 3. The inner cylinder 73 has a peripheral step 72 projecting radially outwards. Over the inner cylinder 73 the operator mounts an outer cylinder 75, which has an inward terminal flange 74, capable of engaging with the step 72. The outer cylinder 75 extends back, in the form of a bell, to just behind the radial flange 41 of the hydraulic pressure ring 37. The inner end, that is to say the righthand end, of the bell shaped outer cylinder 75 terminates in a radially inward flange 76, which engages behind the flange 41 of the pressure ring 37, the radially inward flange 76 having peripheral gaps 42 to give a bayonet catch action which allows the bell shaped outer cylinder 75 to be mounted rapidly and easily on the assembly. The inner cylinder 73 and the outer cylinder 75 between them form a pressure chamber 77, which is limited at its two ends by the step 72 and the inward flange 74. The chamber 77 can be supplied with hydraulic fluid through a rapid hydraulic connection 79 which communicates with the chamber 77 through a drilling 78. The pressure chamber 77 is sealed by ring seals 63 interposed between the inner and outer cylinders 73, 75. A retainer ring 81 is mounted on the inner cylinder 73, to prevent inadvertent separation of the outer cylinder 75.

The bearing is pulled off the conical roll pin end as follows. Before mounting the outer cylinder 75 over the inner cylinder 73, the operator applies hydraulic pressure to the chamber 68, between the inner ring 66 and the outer ring 67, to take the load off the retainer nut 48. After unscrewing the retainer nut 48, which can easily be done by hand, the operator mounts the outer cylinder 75, and applies hydraulic pressure through the rapid hydraulic connection 79 and through the drilling 78 to the chamber 77 between the inner cylinder 73 and the outer cylinder 75. The hydraulic pressure thrusts the inner cylinder 73 towards the right, applying thrust to the retainer strap 43. In the opposite direction the outer cylinder 75 is thrust towards the left, engaging the inward flange 76 with the flange 41 of the hydraulic pressure ring 37. The outward thrust applied to the flange 41 is transmitted to the other parts of the bearing, pulling the bearing off the conical roll pin end. After removing the retainer strap 43, the operator can withdraw the assembly from the roll pin 11, and from its extensions 12 and 13.

FIGS. 5 and 6 show a third version of the invention. This differs from the versions described above mainly in that when the bearing is being released from the conical roll pin end axial thrust is applied by different means to the outer roll pin extension 13. The arrangement also allows the system of hydraulic cylinders to be simplified to a certain extent. In FIGS. 5 and 6 the same reference numbers are used for corresponding parts, as in the previous figures.

As will be seen from FIG. 5, an inner cylinder 46 is mounted on the outer roll pin extension 13. Projecting radially inwards from the inner, cylindrical surface of the inner cylinder 46 there is an intermittent internal collar 101, interrupted by gaps 102 to give a bayonet catch action, as shown in FIG. 6. The internal collar 101 engages in a peripheral groove 103 in the outer roll pin extension 13. Nearest to the end of the roll pin extension 13, that is to say to the left of the peripheral groove 103, in FIG. 5, there project radially outwards from the surface of the roll pin extension 13 ribs 104, evenly spaced around the periphery of the roll pin extension 13. Each rib 104 has the width of the gap 102.

Secured to the outer end of the inner cylinder 46, that is the lefthand end in FIG. 5, by a screw 105 there is an L-section key 106. The foot of the key 106, that is to say the radially inward part, engages in a notch in one of the ribs 104. The head of the key 106, that is to say the radially outward part, engages in a notch in the end of the inner cylinder 46, and also engages in a notch 107 in the outer face of a retainer nut 48, which has a series of notches of this kind evenly distributed around its outer face. The L-section key 106 prevents these parts, the inner cylinder 46 and the retainer nut 48, from rotating relative to the roll pin extension 13. The retainer nut 48 can be locked in any desired position by the head of the key 106.

Mounted over the inner cylinder 46 there is an outer cylinder 51. At the inner end of the cylinder 51, towards the right in FIG. 5, between the outer cylinder 51 and the inner cylinder 46 there is an inserted bush 108. At the outer end of the cylinder 51 a key 109 is inserted between the outer cylinder 51 and the inner cylinder 46, to prevent relative rotation. At its radially outward edge the cylinder 51 terminates in a hook shaped flange 53, which has taps to give a bayonet catch action. The hook engages behind a radially outward flange 41 of the hydraulic pressure ring 37, the flange 41 also having gaps to give a bayonet catch action. It should however be observed that the hook of the flange 53 does not touch the flange 41, the outer cylinder 51 being a rotating part, whereas the hydraulic pressure ring 37 is a stationary part. Near the outer end of the cylinder 51 its inner cylindrical surface has a radially inward step 54, bringing the outer cylinder 51 into working contact with the peripheral surface of the inner cylinder 46.

Between the inner and outer cylinders there are formed two annular pressure chambers 57 and 58. These chambers are connected through drillings 59, 61, penetrating through the wall of the inner cylinder 46, to rapid action hydraulic connections 62. The pressure chambers 57 and 58 are sealed by sealing rings 63 interposed between the inner and outer cylinders. The rapid change device according to the invention is protected by an outer cover 64 which is attached by a welded flange 65 to the hydraulic pressure ring 37.

The rapid change device shown in FIGS. 5 and 6 functions as follows. Let it be assumed that the roll has been removed from the roll stand, and that it is desired to remove the bearing from the conical roll pin end. After removing the outer cover 64, the operator unscrews the screw 105 and removes the L-section key 106. The operator then connects a source of hydraulic pressure to the rapid hydraulic connection 62, and admits hydraulic oil to the pressure chamber 58. The inner cylinder 46 thrusts outwards, towards the left, by its internal collar 101 against the radial ribs 104, which project radially outwards from the outermost roll pin extension 13. In the opposite direction the outer cylinder 51 thrusts inwards, towards the right, against the inner bearing ring 23 of the axial thrust bearing 24. This unloads the retainer nut 48. The operator, for example inserting a dolly bar into the blind hole 111 unscrews the retainer nut 48. The operator then applies hydraulic pressure to the chamber 57, using the rapid hydraulic connection. With the retainer nut 48 unscrewed, the inner cylinder 46 thrusts inwards, towards the right, against the inner shoulder of the peripheral groove 103 in the roll pin extension 13, whereas the outer cylinder 51, moving in the opposite direction, towards the left, engages the hook of its flange 53 with the flange 41 of the hydraulic pressure ring 37, thrusting the pressure ring 37 outwards, towards the left, this outward thrust being transmitted through the annular bearing housing 31 and through the bearing bush holder 16 to the bearing bush 17 and through the shoulder 26 to the shoulder ring 19, so that the entire bearing assembly is forced off the conical end of the roll pin 11. When this has been done the operator rotates the inner cylinder 46, by inserting a dolly bar into the blind hole 112 in the outer cylinder 51, rotating the inner cylinder 46 until the gaps 102 of the internal collar 101 coincide with the radial ribs 104 of the roll pin extension 13. Now the entire quick change bearing assembly can be pulled axially off the roll pin and laid aside. It should be observed that the two bayonet catch actions, between the radial collar 101 and the radial ribs 104 on the one hand, and between the hooked flange 53 and the radial flange 41 on the other hand, are arranged so that this can be done. There are four gaps between the radial ribs 104, but only three gaps in the hooked flange 53. Consequently when the bayonet catch 101, 104 is open, the bayonet catch 53, 41 is still engaged by an angle of 15°, allowing the entire quick change bearing assembly to be pulled off the end of the roll pin 11.

In order to instal the bearing assembly on the roll pin of a fresh roll, and draw it up tight on the conical roll pin end, the procedure is as follows. The operator first mounts the bearing assembly over the roll pin extensions 13 and 12 and over the roll pin end 11. He then rotates the inner cylinder 46 through 45° locking the two bayonet catches 101, 104 and 53, 41. The operator then applies hydraulic pressure to the pressure chamber 58, with the result that the inner cylinder 46 thrusts outwards against the radial ribs 104, whereas the outer cylinder 51 thrusts inwards against the inner bearing ring 23, this inward thrust being transmitted through the shoulder ring 19 to the roll pin journal bush 14, thrusting the latter up over the conical surface of the roll pin end 11. The operator then tightens the retainer nut 48 easily to bring it up against the outer face of the outer cylinder 51. After the operator has released the hydraulic pressure from the chamber 58, the bearing is retained firmly on the conical roll pin end by the retainer nut 48. Finally the operator inserts the L-section key 106, securing it in place by means of the screw 105 and so locking the inner cylinder 46 against rotation relative to the roll pin, by engagement between the key 106 and the radial ribs 104 and a notch 107 of the retainer nut 48.

It should be understood that the bearing assembly according to the invention can equally well be applied to the floating end of the roll, in which case there is of course no axial thrust bearing. Nevertheless the hydraulically or pneumatically actuated parts and bearings engage and disengage as described above. The bearing assembly according to the invention makes it possible for the first time to remove and replace roll pin bearings rapidly and reliably without it being necessary to apply special tools. Damage to the bearing cannot occur. A further particular advantage of the invention is that the forces applied at all stages during the changing of the bearing are accurately adjustable, greatly contributing to the durability of the bearing seat.

We claim:

1. A roller and bearing assembly comprising a roller having a conical-shaped mounting pin extending axially outwardly from said roller and a projection extending axially outwardly from the outer end of said mounting pin, a bearing assembly comprising a journal bush in fitting engagement with said mounting pin, a bearing bush laterally enclosing said journal bush and said journal bush rotatable relative to said bearing bush, means for restraining said bearing bush from axial movement relative to said journal bush, stationary holder means for fixedly mounting said bearing bush, stop means fixed to said projection on said roller at a location axially outwardly from said mounting pin, fluid pressure operable means mounted on said projection axially outwardly from said mounting pin and arranged to engage said stop means, and fluid connection means for supplying pressurized fluid to said fluid pressure operable means for thrusting said journal bush and bearing bush and holder means toward said roller so that said journal is in fitting engagement with said mounting pin and for withdrawing said journal bush from said mounting pin and removing said journal bush, bearing bush and holder means from said roller.

2. A rolling and bearing assembly according to claim 1, wherein said fluid pressure operable means comprises a double acting cylinder means.

3. A roller and bearing assembly according to claim 2, wherein said double-acting cylinder means includes an inner cylinder laterally encircling said projection, a key mounting said inner cylinder to said projection, external thread means on an outwardly facing axially outer end portion of said inner cylinder, a retainer nut co-acting with said external thread means on said axially outer portion of said inner cylinder, a peripheral collar ring formed on and projecting radially outwardly from said inner cylinder axially inwardly from said external thread means, an unthreaded portion on the outer surface of said inner cylinder located axially inwardly of said external thread means, and an outer cylinder disposed radially outwardly from said inner cylinder and disposed in sliding contact with said peripheral collar ring.

4. A rolling and bearing assembly according to claim 3, further including an L-section bush attached to the outer end of said outer cylinder, an inner cylindrical surface of said bush being in sliding contact with the unthreaded radially inner portion of said inner cylinder, and the axially outer surface of said L-section bush contacting said retainer nut, and a radially inward step adjacent the axially inner end of said outer cylinder contacting said axially inner unthreaded portion of said inner cylinder in a sliding fit.

5. A roller and bearing assembly according to claim 4, including a flange at the axially outer end of said outer cylinder, said flange comprising a radially outwardly extending first portion extending radially outwardly from the outer surface at the outer end of said outer cylinder, a second portion extending axially inwardly from said radially outwardly extending portion, and a third portion extending radially inwardly from the end of said second portion spaced from said first portion, an annular bearing housing rigidly connected to said holder means, a pressure ring detachably attached to said bearing housing, an outwardly extending flange on said pressure ring extending between said first and third portions of said flange on said outer cylinder and spaced radially inwardly from said second portion of said flange on said outer cylinder with a clearance to permit relative rotation therebetween, and both said flanges having gaps whereby said flanges cooperate with one another in a bayonet catch action, said restraining means including a shoulder ring detachably attached to said journal bush, thrust bearing means located adjacent to and axially outwardly from said shoulder ring, and a radially inwardly extending annular flange at said axially inner end of said outer cylinder extending inwardly from said step and arranged to thrust axially against said thrust bearing means.

6. A roller and bearing assembly according to claim 5, wherein said double-acting cylinder means includes a first annular pressure chamber formed between said inner and outer cylinders, said L-section bush and said peripheral collar ring, and a second annular pressure chamber formed between said inner and outer cylinders, said peripheral collar ring and said radially inward step of said outer cylinder, said fluid connection means includes two rapid-action fluid pressure connections on said outer cylinder and a first passage between one of said connections and said first pressure chamber and a second passage leading between the other said connection and said second pressure chamber.

7. A roller and bearing assembly according to claim 6, wherein said fluid pressure connections are situated on the axially outer face of said first portion of said flange of said outer cylinder and each said fluid pressure connection comprises a series arrangement from its said connection a radially extending first portion, an axially extending second portion and a radially extending third portion.

8. A roller and bearing according to claim 1, wherein said fluid pressure operable means comprises at least one single acting cylinder means.

9. A roller and bearing assembly according to claim 8, wherein said projection on said mounting pin of said roller includes an axially inner and an axially outer projection, and said at least one single-acting cylinder means comprises an inner cylinder, a key mounting said inner cylinder to said outer projection, external threading on an axially outer portion of the exterior surface of said inner cylinder, a retainer nut cooperating with said threading, a peripheral collar ring formed integrally with and projecting radially outwardly from an axially inner unthreaded portion of said exterior surface of said inner cylinder axially inwardly from said external threading, an outer cylinder laterally surrounding said inner cylinder and contacting said peripheral collar ring in a sliding fit.

10. A roller and bearing assembly according to claim 9, wherein the axially outer end of said outer cylinder abuts said retainer nut, and said outer cylinder having a radially inwardly extending step adjacent its axially inner end in sliding contact with said unthreaded portion of said outer surface of said inner cylinder.

11. A roller and bearing assembly according to claim 10, wherein said outer cylinder has an inwardly extending terminal annular flange, a shoulder ring detachably connected to said journal bush, axial thrust bearing means located axially outwardly from and adjacent to said shoulder ring, and said terminal annular flange of said outer cylinder arranged to abut against said thrust bearing means at a location spaced axially outwardly from said shoulder ring.

12. A roller and bearing assembly according to claim 11, wherein said at least one single-acting cylinder means includes a pressure chamber formed in the axial direction between said peripheral collar ring and said radially inward step spaced axially inwardly therefrom and in the radial direction between said inner cylinder and said outer cylinder, and said fluid connection means comprises a fluid pressure connection located on the exterior of said outer cylinder, and a passage communicating between said pressure chamber and said connection.

13. A roller and bearing assembly according to claim 8, wherein said projection includes an axially inner and an axially outer projection and said fluid pressure operable means comprises an inner cylinder mounted on said outer projection of said mounting pin of said roller and abutting the axially inner side of said stop means, a radially outwardly extending annular step on said inner cylinder, an outer cylinder in sliding contact with said radially outwardly extending step on said inner cylinder, an inwardly extending annular collar on said outer cylinder disposed at the axially outward end thereof and arranged in sliding contact with said inner cylinder, said inner cylinder having an axially inner portion of bell form, an inwardly directed hook-shaped flange on the radially outer surface of said outer cylinder, an annular bearing housing connected to said holder means, a pressure ring abutting said annular bearing housing axially outwardly from said journal bush, an outwardly directed flange on said pressure ring at the axially outer end thereof, said flange on said pressure ring and said hook-shaped flange on said outer cylinder each formed with a series of gaps whereby said flanges cooperate in a bayonet catch action.

14. A roller and bearing assembly according to claim 13, wherein said radially outwardly extending annular step on said inner cylinder and said radially inward annular collar on said outer cylinder between them define a pressure chamber, and said fluid connection means comprises a connection on said outer cylinder and a passage communicating between said pressure chamber and said connection.

15. A roller and bearing assembly according to claim 1 wherein said stop means comprises a two-part retainer strap.

16. A roller and bearing assembly according to claim 1, wherein said stop means comprises a radially outwardly projecting rib on said projection.

17. A roller and bearing assembly according to claim 16, wherein said projection includes an axially inner and an axially outer projection, and said stop means comprises a plurality of radial ribs distributed uniformly around the periphery of said outer projection, and said fluid pressure operable means includes an inner cylinder, a collar projecting inwardly from the inner cylindrical surface of said inner cylinder, said collar having gaps distributed about it in conformity with the position of said ribs constituting said stop means and the angular extent of said gaps corresponding to the angular extent of said radial ribs.

18. A roller and bearing assembly according to claim 17, wherein said fluid pressure operable means includes an outer cylinder, a hook-shaped flange on said outer cylinder comprising a first portion extending radially outwardly from the outer surface of said outer cylinder, a second portion extending axially inwardly from the outer end of said first portion and a third portion extending radially inwardly from the end of said second portion spaced from said first portion, said third portion having a plurality of gaps different from said plurality of radial ribs constituting said stop means.

19. A roller and bearing assembly according to claim 18, wherein said inner cylinder has an axially outer threaded portion on its outer surface, a retainer nut screwed onto said threaded portion, the axially outer face of said inner cylinder and the axially outer face of said retainer nut are notched, and an L-section key is provided having one limb engaging said notch in said radial ribs and a second limb engaging both said notch in said inner cylinder and said notch in said retainer nut.

20. A roller and bearing assembly according to claim 19, wherein said inner and outer cylinders define between them two annular pressure chambers, and said fluid connection means includes two hydraulic connections provided on said inner cylinder and two passages each communicating between one of said connections and one of said chambers.

21. A roller and bearing assembly according to claim 20, including an annular bush interposed between the outer surface of said inner cylinder and the inner surface of said outer cylinder adjacent the axially inner ends thereof.

* * * * *

UNITED STATES PATENT OFFICE
CERTIFICATE OF CORRECTION

Patent No. 3,799,636        Dated March 26, 1974

Inventor(s) Emil Friedrich Kersting and Frank Deimann

It is certified that error appears in the above-identified patent and that said Letters Patent are hereby corrected as shown below:

In the heading of the patent, insert

--[30]     Foreign Application Priority Data

February 16, 1970 Germany.................P 20 06 954.9
     July 18, 1970     Germany.................P 20 35 698.3--

Signed and sealed this 13th day of August 1974.

(SEAL)
Attest:

McCOY M. GIBSON, JR.           C. MARSHALL DANN
Attesting Officer               Commissioner of Patents